United States Patent
Hayakawa (10) Patent No.: US 10,402,057 B2
(45) Date of Patent: Sep. 3, 2019

(54) DISPLAY CONTROL APPARATUS AND METHOD FOR CALCULATING GLOSS PARAMETER DURING PAGE TURN OF PRINT PREVIEW

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 15/226,490

(22) Filed: Aug. 2, 2016

(65) Prior Publication Data

US 2017/0038930 A1 Feb. 9, 2017

(30) Foreign Application Priority Data

Aug. 7, 2015 (JP) ................. 2015-157649

(51) Int. Cl.
| | |
|---|---|
| *G06T 11/60* | (2006.01) |
| *G06T 13/80* | (2011.01) |
| *G06F 3/0483* | (2013.01) |
| *H04N 1/00* | (2006.01) |

(Continued)

(52) U.S. Cl.
CPC .......... *G06F 3/0483* (2013.01); *G06T 11/60* (2013.01); *G06T 13/80* (2013.01); *H04N 1/00161* (2013.01); *H04N 1/2323* (2013.01); *H04N 1/6097* (2013.01); *G06T 2200/24* (2013.01); *H04N 1/0044* (2013.01); *H04N 1/00196* (2013.01)

(58) Field of Classification Search
CPC .... G06F 3/1208; G06F 3/1242; G06F 3/1256; G06F 3/1252; G06F 3/1257; G06F 3/0483; G06F 3/1253; G06T 11/60; G06T 13/80; G06T 2200/24; H04N 1/2323; H04N 1/6097; H04N 1/00161; H04N 1/00196; H04N 1/0044–00456
See application file for complete search history.

(56) References Cited

U.S. PATENT DOCUMENTS

| | | | |
|---|---|---|---|
| 9,219,830 B1* | 12/2015 | Ciorba | ............... H04N 1/00177 |
| 2007/0211269 A1* | 9/2007 | Patrick | ................. H04N 1/6011 358/1.9 |

(Continued)

FOREIGN PATENT DOCUMENTS

| | | |
|---|---|---|
| JP | 2004-048284 A | 2/2004 |
| JP | 2005-339250 A | 12/2005 |
| JP | 2011-140135 A | 7/2011 |

*Primary Examiner* — Ajay M Bhatia
*Assistant Examiner* — Phoebe X Pan
(74) *Attorney, Agent, or Firm* — Canon U.S.A., Inc. IP Division (57) ABSTRACT

A display control apparatus includes an acquiring unit, a generating unit, and a display control unit. The acquiring unit acquires an image data group. The generating unit generates a layout image of a spread page, an image based on image data selected from the image data group acquired by the acquiring unit being arranged in the layout image. The display control unit causes a display unit to display a preview image of the layout image of the spread page generated by the generating unit based on a gloss parameter. The gloss parameter is used in varying a glossiness of the page of the preview image depending on a position of an end of the page in the preview image.

18 Claims, 11 Drawing Sheets

(51) Int. Cl.
*H04N 1/23* (2006.01)
*H04N 1/60* (2006.01)

(56) References Cited

U.S. PATENT DOCUMENTS

| | | | |
|---|---|---|---|
| 2010/0039671 A1* | 2/2010 | Matusik | B41J 2/2132 |
| | | | 358/2.1 |
| 2012/0051777 A1* | 3/2012 | Itami | G03G 15/5062 |
| | | | 399/81 |
| 2013/0250312 A1* | 9/2013 | Miyazaki | G03G 15/01 |
| | | | 358/1.1 |
| 2014/0126006 A1* | 5/2014 | Yoshida | H04N 1/387 |
| | | | 358/1.9 |
| 2014/0293304 A1* | 10/2014 | Seto | G06K 15/025 |
| | | | 358/1.12 |

\* cited by examiner

| AMBIENT LIGHT COEFFICIENT | $k_a$ | 0.5 |
|---|---|---|
| DIFFUSE REFLECTION COEFFICIENT | $k_d$ | 0.2 |
| SPECULAR REFLECTION COEFFICIENT | $k_s$ | 0.3 |
| LUMINANCE COEFFICIENT | $\alpha$ | 10.0 |

FIG. 7B

| AMBIENT LIGHT COEFFICIENT | $k_a$ | 0.5 |
|---|---|---|
| DIFFUSE REFLECTION COEFFICIENT | $k_d$ | 0.5 |
| SPECULAR REFLECTION COEFFICIENT | $k_s$ | 0.0 |
| LUMINANCE COEFFICIENT | $\alpha$ | 10.0 |

FIG. 8

$$I_{out} = k_a I_{in} + k_d(L \cdot N)\ I_{in} + k_s(R \cdot V)^\alpha I_{in}$$

DISPLAY CONTROL APPARATUS AND METHOD FOR CALCULATING GLOSS PARAMETER DURING PAGE TURN OF PRINT PREVIEW

BACKGROUND OF THE INVENTION

Field of the Invention

The present invention relates a display control apparatus, a display control method, and a program that display a preview.

Description of the Related Art

A photo album is a collection of photographs, generally in a book. In creation of photo albums, methods are known in which photos owned by customers are laid out to generate photo album data and the generated photo album data is transmitted to photo album production companies via the Internet or the like (refer to Japanese Patent Laid-Open No. 2004-48284). At the photo album production companies, the transmitted data is subjected to printing and bookbinding and the created photo albums are delivered to addresses specified by the customers.

In generation of photo album data and ordering of photo albums, finishing may be specified. The finishing includes sheets of paper (medium types) used for the printing and a bookbinding mode (perfect binding or folio binding).

However, there is an issue in that it is difficult for users to estimate the final finishing only with sample photos and words indicating paper types used for printing and bookbinding modes.

SUMMARY OF THE INVENTION

According to an embodiment, a display control apparatus includes an acquiring unit configured to acquire an image data group, a generating unit configured to generate a layout image of a spread page, an image based on image data selected from the image data group acquired by the acquiring unit being arranged in the layout image, and a display control unit configured to cause a display unit to display a preview image of the layout image of the spread page generated by the generating unit based on a gloss parameter. The gloss parameter is used in varying a glossiness of the page of the preview image depending on a position of an end of the page in the preview image.

Further features of the present invention will become apparent from the following description of exemplary embodiments with reference to the attached drawings.

DESCRIPTION OF THE EMBODIMENTS

Embodiments of the present invention will herein be described in detail with reference to the attached drawings. The invention according to the appended claims is not limited to the embodiments described below and all the combinations of features described in the embodiments are not necessarily essential to the present invention.

<First Embodiment>

Figure 1:
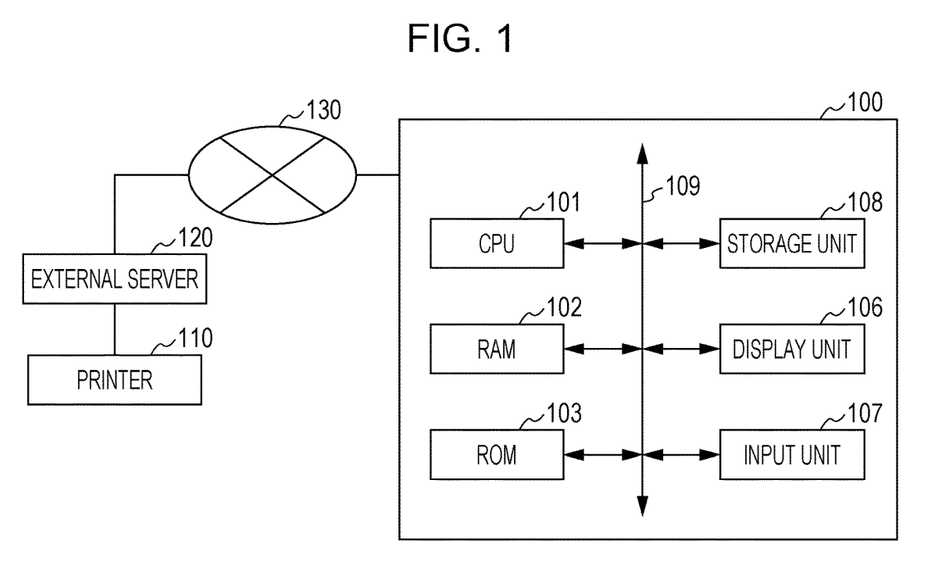
FIG. 1 illustrates an exemplary information processing system according to a first embodiment.

FIG. 1 illustrates an exemplary information processing system according to a first embodiment. The information processing system includes an external server 120 and an information processing apparatus 100, which are connected to each other via a network 130.

The information processing apparatus 100 is capable of generating image data for an album (a photo album or a photo book) from image data that is input. In addition, the information processing apparatus 100 is capable of outputting, for example, printing the generated image data for an album and uploading the generated image data for an album to the external server 120 over the network 130. It is sufficient for the information processing apparatus to function as a display control apparatus that edits images. The information processing apparatus is, for example, a personal computer (PC), a smart phone, or a printer. It is assumed in the first embodiment that the information processing apparatus is a PC.

The information processing apparatus 100 includes a central processing unit (CPU) 101, a read only memory (ROM) 103, a random access memory (RAM) 102, a display unit 106, an input unit 107, and a storage unit 108, which are connected to each other via a system bus 109. The information processing apparatus 100 also includes an input-output interface (not illustrated) for connecting to the network 130.

The CPU 101 executes an operating system (OS) program stored in, for example, the storage unit 108, the ROM 103, or the RAM 102 to control the entire information processing apparatus 100. The CPU 101 executes programs stored in the ROM 103 and the RAM 102 to realize each functional configuration of the information processing apparatus 100 and to perform arithmetic operations, processing, and so on of information. The ROM 103 stores the programs. The RAM 102 is used as a working memory for the CPU 101 and a temporary storage area of a variety of data.

The display unit 106 displays image information that is output in the information processing apparatus 100. The input unit 107 is used by a user for input into the information processing apparatus 100 and is, for example, a keyboard or a pointing device. Although the display unit 106 is separated from the input unit 107 in the first embodiment, the display unit 106 may be integrated with the input unit 107, as in a touch panel. The storage unit 108 stores image data, templates, and so on and is, for example, a hard disk drive (HDD) or a solid state drive (SSD). In the first embodiment, the storage unit 108 stores an album creation application program described in detail below.

Although the information processing apparatus 100 includes the display unit 106, the input unit 107, and the storage unit 108 in FIG. 1, the information processing apparatus 100 is not limited to this configuration. The display unit 106, the input unit 107, and the storage unit 108 may not be provided in the information processing apparatus 100 or may be external apparatuses connected to the information processing apparatus 100.

The network 130 is connected to the information processing apparatus 100 and the external server 120. Information in the information processing apparatus 100 and information in the external server 120 are transmitted over the network 130.

The external server 120 includes an input-output interface (not illustrated) for connecting to a printer 110 and is connected to the printer 110 via the input-output interface.

It is assumed in the first embodiment that the external server 120 is an album ordering and management server. The user uploads image data for creating an album, which has been generated in the user's information processing apparatus 100, to the external server 120. If it is determined that printing is available (for example, necessary album purchase procedure has been carried out), a printed material is output from the printer 110 based on the image data for creating an album, which has been uploaded to the external server 120. Then, the printed material that is output is subjected to bookbinding and is delivered to the user.

Figure 2:
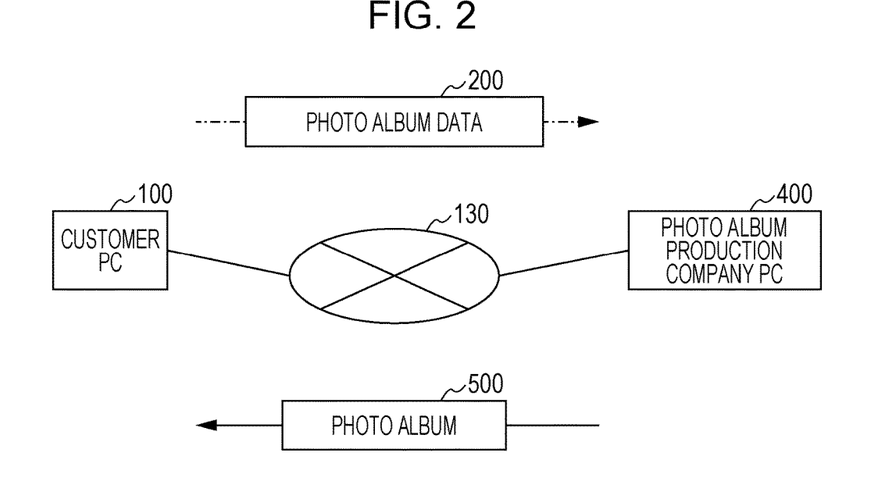
FIG. 2 schematically illustrates an example of the relationship between a customer and a photo album production company.

How to order photo album data will now be simply described with reference to FIG. 2. Referring to FIG. 2, a customer PC 100 generates photo album data 200 at a remote site apart from a photo album production company. The customer PC 100 corresponds to the information processing apparatus 100 illustrated in FIG. 1. The generated photo album data 200 is transmitted to a photo album production company PC 400 at a remote site via the network 130, such as the Internet. The photo album production company PC 400 corresponds to the external server 120 illustrated in FIG. 1. The photo album data 200 includes photos and layout information used by the customer and associated information about a bookbinding mode and a paper type. The photo album production company PC 400 receives the photo album data 200 via the network. Then, the photo album production company PC 400 performs printing on a medium, such as a sheet of paper, with a printing apparatus based on the photo album data 200 and performs the bookbinding to create a photo album 500. The photo album 500 is delivered to the customer using a physical delivery method, such as a home delivery service.

Payment of the fee of the photo album 500 is not particularly limited. After the photo album data 200 is generated and transmitted, the fee of the photo album 500 may be paid using electronic payment or the like or using bank transfer or the like. In addition, the delivery method is not particularly limited. The customer may directly receive the photo album 500 from the photo album production company. Alternatively, the photo album 500 may be delivered via another retail photo album production company, which is a partner of the photo album production company.

Figure 3:
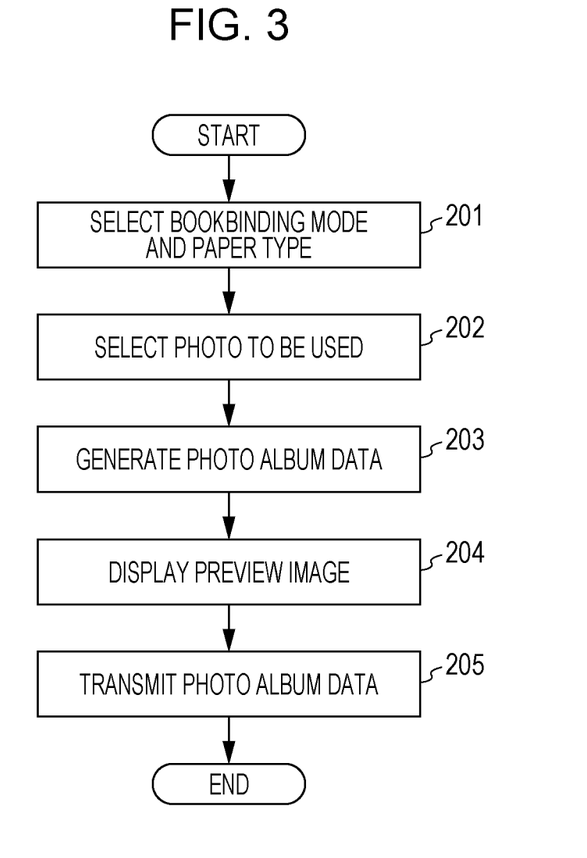
FIG. 3 is a flowchart illustrating an exemplary data generation process in the first embodiment.

A process of creating and ordering the photo album data 200 by the customer will now be described with reference to FIG. 3 and FIGS. 4A and 4B. FIG. 3 is a flowchart illustrating an exemplary process performed by an album creation application in the information processing apparatus 100. In the first embodiment, the album creation application stored in the storage unit 108 is started, for example, when the user double-clicks an icon of the application displayed in the display unit 106. Specifically, the album creation application program stored in the storage unit 108 is loaded into the RAM 102 and the program loaded into the RAM 102 is executed by the CPU 101 to start the album creation application.

The application for creating the photo album data 200 is, for example, delivered by the photo album production company. The customer (user) is capable of downloading the application from a Web page on which the photo album production company provides a photo album creation service or an application delivery service Liked to the Web page.

Figure 4A:
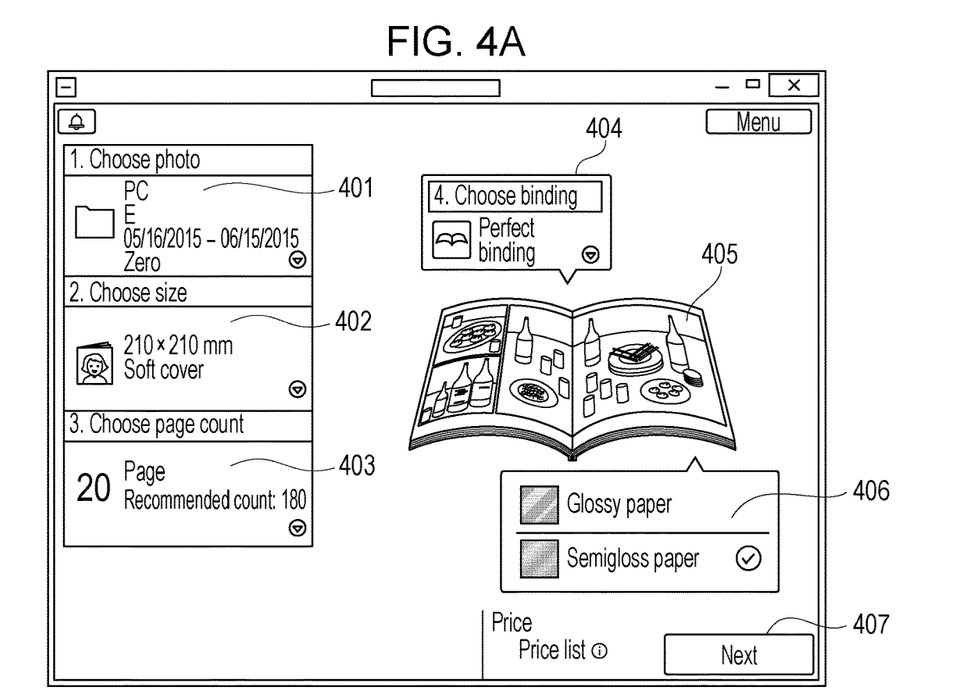
FIGS. 4A and 4B illustrate examples of a display screen used for creation of an album in the first embodiment.
Figure 4B:
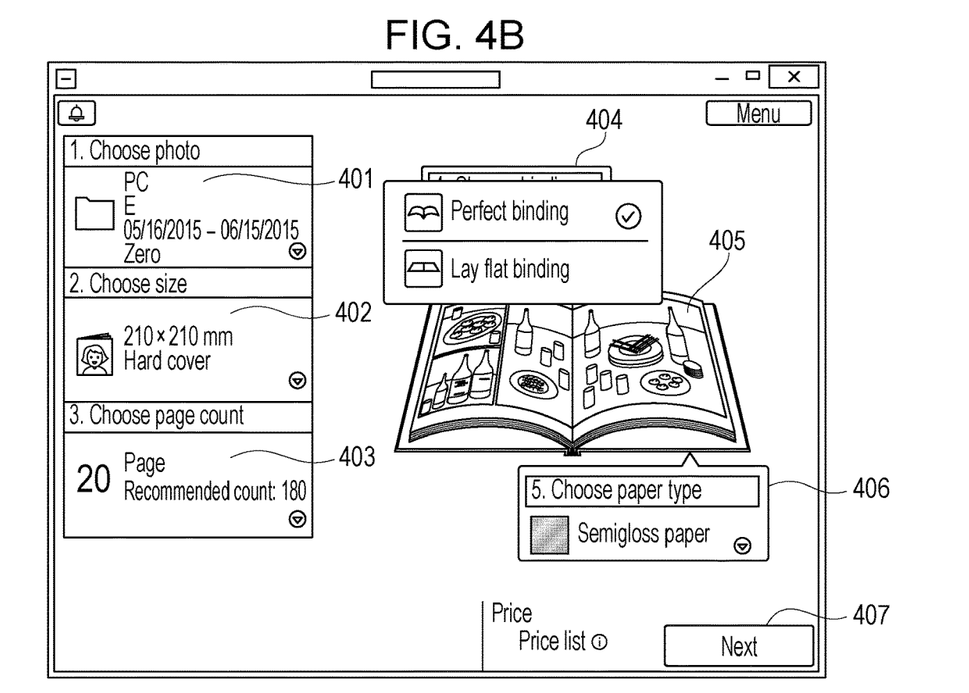

FIGS. 4A and 4B illustrate examples of a display screen provided by the album creation application. The display screen is displayed in the display unit 106. The display screen illustrated in FIGS. 4A and 4B is a selection screen for selecting the bookbinding mode, the paper type, and a photo that is used. Referring to FIGS. 4A and 4B, the display screen includes a photo selector 401, a size selector 402, a page count selector 403, a binding method selector 404, a preview image 405, a paper selector 406, and a Next button 407.

The photo selector 401 is used to select a photo from a folder stored in the storage unit 108 or the like.

The size selector 402 is used to select the size of an album to be created. The page count selector 403 is used to select the page count of the album to be created. In the first embodiment, a recommended photo count in the creation of the album having the selected page count is displayed in the page count selector 403.

The binding method selector 404 is used to select the method of binding the album to be created. Upon depression of a pull-down button in the binding method selector 404, the binding methods which the user is capable of choosing are displayed, as illustrated in FIG. 4B. Although perfect binding and lay flat binding are available in the first embodiment, the methods of binding the album are not limited to the above ones.

The paper selector 406 is used to select the paper type (material) of the album to be created. Upon depression of a pull-down button in the paper selector 406, the paper materials which the user is capable of choosing are displayed, as illustrated in. FIG. 4A. Although glossy paper and semigloss paper are available in the first embodiment, the sheet materials are not limited to the above ones.

The preview image 405 is an image in which the conditions selected with the photo selector 401, the binding method selector 404, and the paper selector 406 are reflected.

Upon selection of the Next button 407, the display screen is changed to a screen on which each image is laid out (not illustrated).

The flowchart in FIG. 3 is started upon display of the display screen for creating an album in the display unit 106, as illustrated in FIGS. 4A and 4B, in response to the start of the application.

Referring to FIG. 3, in Step 201, the application accepts selection of the bookbinding mode and the paper type. In the first embodiment, the user selects the binding method on the binding method selector 404 and the paper type on the paper selector 406, as illustrated in FIGS. 4A and 4B, with the input unit 107 and the application accepts the selection of the bookbinding mode and the paper type.

In the first embodiment, the paper type (medium type) is selected from two kinds: glossy paper and matte paper (also referred to as semigloss paper). The glossy paper is paper that is strongly highlighted depending on the plane and the angle of a light source. The matte paper is paper that is less highlighted depending on the plane and the angle of the light source.

In the first embodiment, the bookbinding mode is selected from two kinds: perfect binding and lay flat binding. The perfect binding is a bookbinding mode in which a book is bounded with adhesive or the like. The book has shadow at a central portion of the binding in the perfect binding. The lay flat binding is a bookbinding mode in which left and right pages are in a flat state when a book is opened. The book has no shadow at a central portion of the binding in the lay flat binding.

The timing when the bookbinding mode is selected and the timing when the paper type is selected are not limited to the above ones and may be set before display of a preview image in Step 204 described below. Although the user selects the bookbinding mode and the paper type in the first embodiment, the selection of the bookbinding mode and the paper type is not limited to this. A predetermined bookbinding mode and/or a predetermined paper type may be used. Although the bookbinding mode is the binding method in the first embodiment, the bookbinding mode is not limited to this. For example, the bookbinding mode may be a bookbinding method or a finishing method.

In Step 202, the application accepts selection of a photo to be used in the photo album. Specifically, the user selects a photo on the photo selector 401, illustrated in FIGS. 4A and 4B, with the input unit 107 and the application accepts the selection of the photo to be used in the photo album, that is, the selection of the photo to be used in the creation of the album. Although a photo is manually selected in the first embodiment, a photo may be automatically selected according to a specific algorithm. The pieces of image data representing photos are acquired from the storage unit 108 or an external apparatus connected to the information processing apparatus 100. At least one piece of image data to be used in the photo album is selected from the acquired image data group.

In Step 203, the application generates photo album data based on the selected photo. In the first embodiment, upon depression of the Next button 407 in the display screen illustrated in FIGS. 4A and 4B, the display screen is changed to a screen on which the photo album data is generated. The photo album data is generated by laying out an image (photo) in each page. A method of laying out the image is not particularly limited. The user may manually arrange the photo in the page or may select a template that is set to arrange the photo in the selected template. Alternatively, a template may be automatically selected according to an algorithm to automatically arrange the photo in the selected template. In addition, illustrations and/or texts may be added, in addition to the photos, in an album to be created. Layout images corresponding to one or more pages, each of which includes multiple photos represented by photo data, are capable of being generated using the photo album data. The photo album data includes the photo data to be used, the layout information associated with the photo data, and bookbinding information indicating the bookbinding mode and the paper type.

In Step 204, the application generates preview data from the generated photo album data and displays the display screen including a preview image based on the preview data in the display unit 106. The user is capable of confirming the state of the album that is completed from the displayed preview image. As described above, the bookbinding mode and the paper type may be selected at this timing and the bookbinding mode and the paper type that are selected may be reflected in the preview data. How to draw the preview data will be described in detail below.

In Step 205, the application transmits the generated photo album data 200 to the photo album production company PC 400. Specifically, upon depression of an ordering button or the like displayed on the display screen provided by the application by the user, the information processing apparatus 100 transmits the photo album data 200 to the photo album production company PC 400 via the network. 130.

Figure 5:
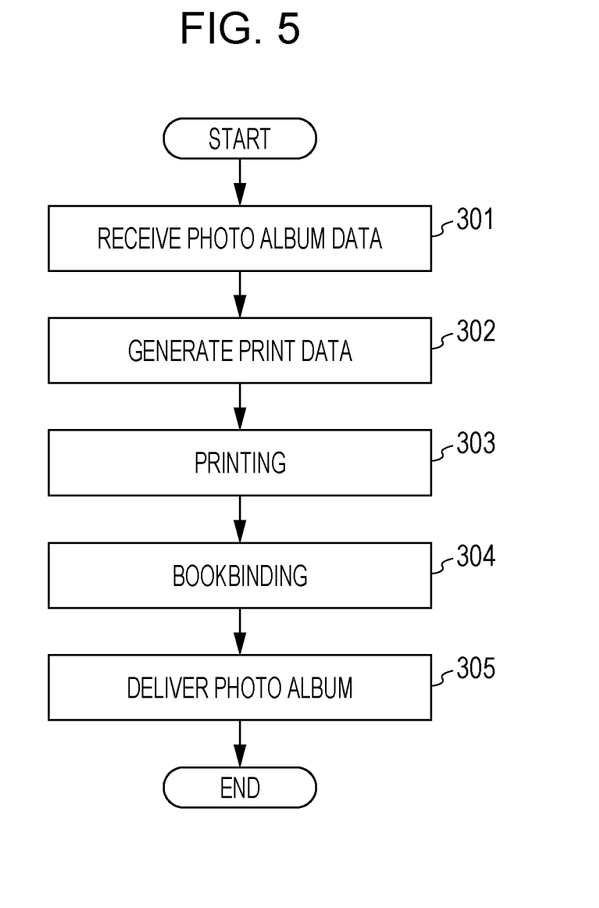
FIG. 5 is a flowchart illustrating an exemplary process when the photo album production company produces and ships a photo album.

FIG. 5 is a flowchart illustrating an exemplary process of printing the photo album data 200 transmitted to the photo album production company PC 400 in Step 205 in FIG. 3, performing the bookbinding, and delivering the photo album to the customer.

Referring to FIG. 5, in Step 301, the photo album production company PC 400 receives the photo album data 200.

In Step 302, the photo album production company PC 400 generates print data from the received photo album data 200.

In Step 303, the photo album production company PC 400 causes the printer to perform the printing based on the print data on the paper type specified in the photo album data 200.

In Step 304, the photo album production company PC 400 performs the bookbinding to the printed material printed with the printer in the bookbinding mode specified in the photo album data 200 with a bookbinding apparatus to create the photo album 500.

In Step 305, the photo album production company PC 400 delivers the photo album 500 subjected to the bookbinding to the customer.

The following paper types and bookbinding modes will be described for description of examples.

Figure 6:
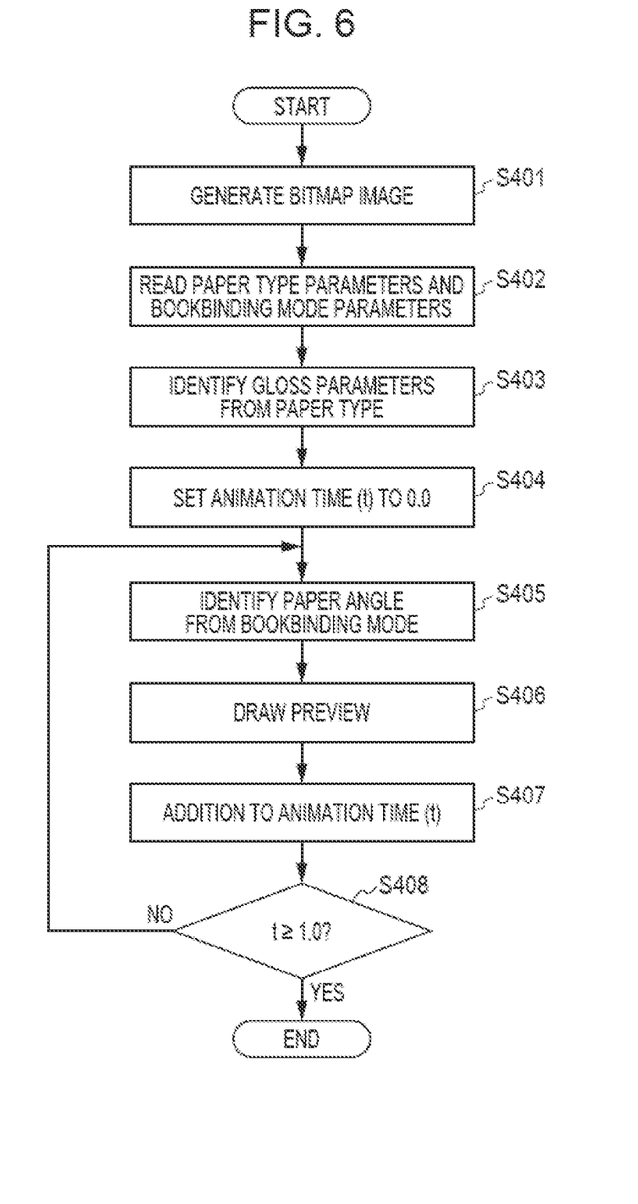
FIG. 6 is a flowchart illustrating an exemplary preview drawing process in the first embodiment.

FIG. 6 is a flowchart illustrating an exemplary process of drawing page turning animation in the preview of the album, performed in Step 204 in FIG. 3. The layout image in which an image is arranged on a sheet of paper is displayed as the preview image through the flowchart illustrated in FIG. 6. A certain spread page of the album is displayed in the layout image. The spread corresponds to one display window in display and corresponds to a pair of pages that are printed on different sheets of paper and that are adjacent to each other in printing.

The flowchart illustrated in FIG. 6 is realized through loading of the album creation application program stored in the storage unit 108 into the RAM 102 and execution of the program loaded into the RAM 102 by the CPU 101. Although the two kinds of paper types: the glossy paper and the matte paper are exemplified in the first embodiment, the paper types are not limited to the above ones. Other paper types may be used. In addition, the two kinds of bookbinding modes: the perfect binding and the lay flat binding are exemplified in the first embodiment, the bookbinding modes are not limited to the above ones. Other bookbinding modes may be used.

Referring to FIG. 6, in Step S401, the application generates a bitmap image for each page from the photo album data that is generated. In display of the spread page (two pages), the bitmap image corresponding to the two pages is used.

Figure 7A:
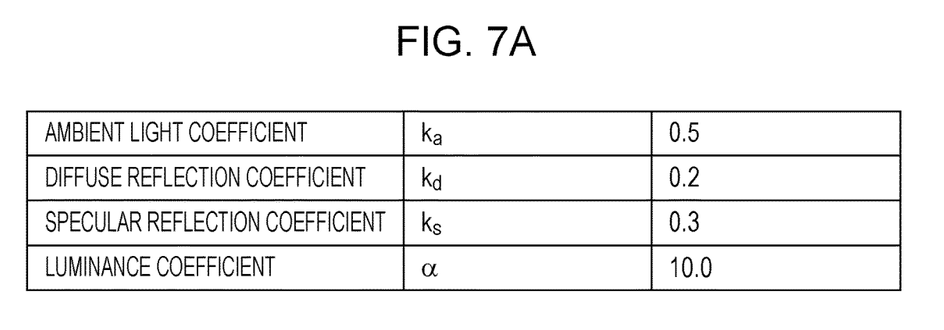
FIGS. 7A and 7B are tables indicating gloss parameters in the first embodiment.
Figure 7B:
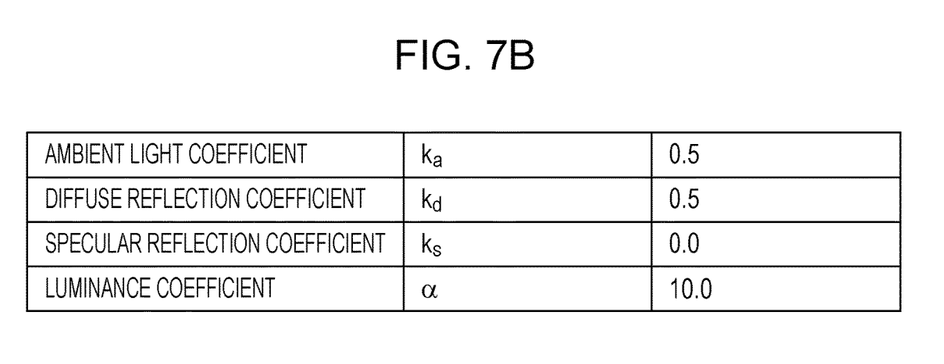

In Step S402, the application reads out parameters corresponding to the paper type, which is described in detail below with reference to FIGS. 7A and 7B, and the bookbinding mode from the storage unit 108. Specifically, gloss parameters corresponding to the paper type and angle parameters corresponding to the bookbinding mode are acquired.

Figure 8:
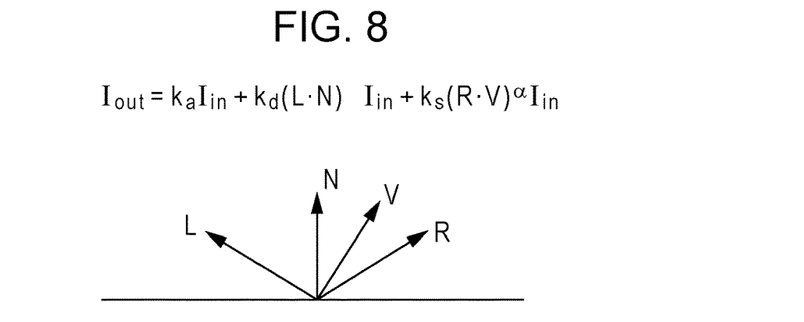
FIG. 8 illustrates a calculation formula in the first embodiment.

The parameters of each paper type will now be described with reference to FIGS. 7A and 7B and FIG. 8. FIGS. 7A and 7B are tables indicating the parameters set for the respective paper types. FIG. 7A is a table indicating the parameters set for the glossy paper. FIG. 7B is a table indicating the parameters set for the matte paper. As illustrated in FIGS. 7A and 7B, an ambient light coefficient, a diffuse reflection coefficient, a specular reflection coefficient, and a luminance coefficient are set as the parameters. Which parameters are used is determined depending on the paper type selected in Step 201 in FIG. 3, among the parameters for the glossy paper and the parameters for the matte paper. These parameters are used in a calculation formula of glossiness, illustrated in FIG. 8. In the calculation formula in FIG. 8, $I_{out}$ denotes an output luminance value, that is, a luminance value in drawing. $I_{in}$ denotes an input luminance value, which is calculated from the bitmap image generated in Step S401 in FIG. 6 using a texture mapping technology generally used in computer graphics. $K_a$ denotes the ambient light coefficient, which determines a predetermined luminance regardless of the positions of the light source and a point of view. $K_d$ denotes the diffuse reflection coefficient, which determines a luminance that is varied with the angle of incidence of light from the light source. When $K_d$ is high, the preview represents the texture of the matte paper. $K_s$ denotes the specular reflection coefficient, which determines a luminance that is varied with the angle of incidence of the light from the light source and the angle of the point of view. $K_s$ determines a high luminance or a low luminance depending on the angle of incidence and the angle of the point of view. When $K_s$ is high, the preview represents the texture of the glossy paper. In the calculation formula in FIG. 8, α (lowercase alpha letter) denotes the luminance coefficient other than the specular reflection coefficient, which is used to calculate the specular reflection luminance. L is a vector indicating the direction of the light source, which is normally set to the upper left direction. N denotes a normal vector of the position where the luminance is calculated. Determination of the angle of page turning determines the normal vector. R denotes a vector indicating the direction when the specular reflection occurs at a target point, which is calculated from, for example, the vector L indicating the direction of the light source and the normal vector N. V denotes a point of view vector indicating the direction of the point of view of the user and is normally set to the z-axis direction, which is a depth direction.

Figure 9:
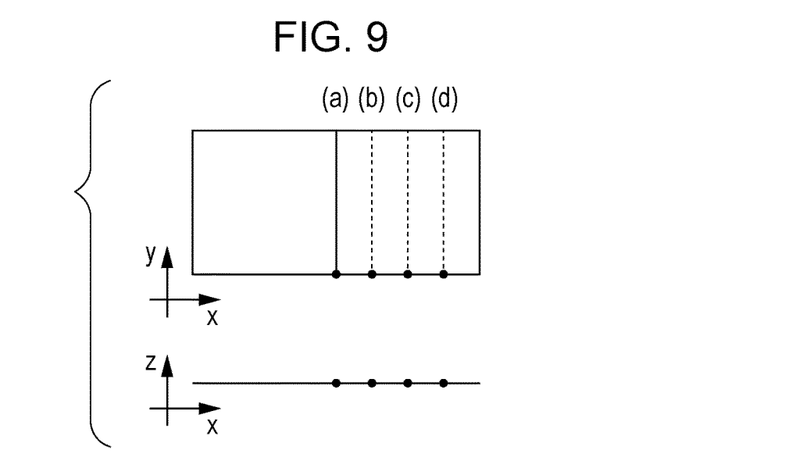
FIG. 9 is a diagram for describing page turning in the first embodiment.
Figure 10:
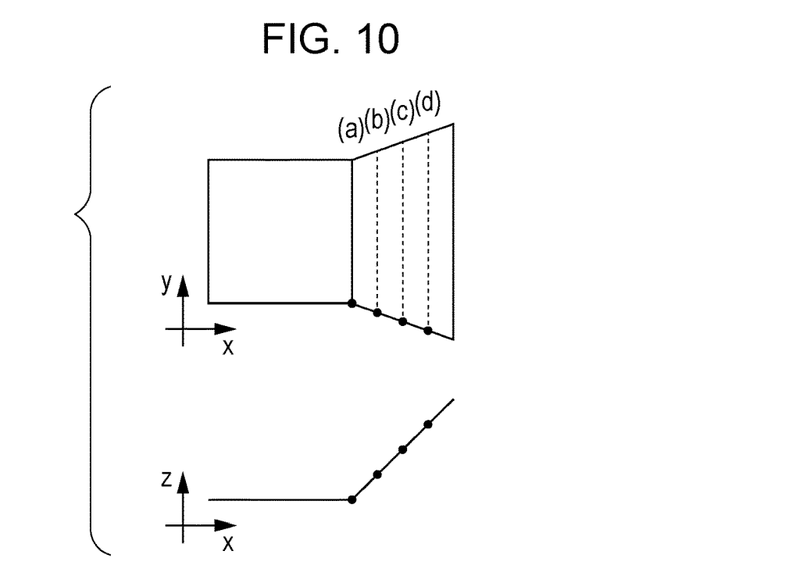
FIG. 10 is a diagram for describing a case in which a page turning angle is set to 45° in the first embodiment.

The parameters of each bookbinding mode will now be described with reference to FIG. 9 to FIG. 12. As illustrated in FIG. 9 and FIG. 10, one page in the spread page (two pages) is divided at predetermined intervals and data about the angle of each divided point is acquired. Although one page is divided into four in the first embodiment, the number of divisions and the division interval are not limited to the above ones. The coordinate position of the divided point is calculated in the following manner using the division interval and the angle. FIG. 10 illustrates coordinate values when all the angles between the lines connecting the coordinate positions of the divided points in the xz coordinate to a center point and the x-axis are set to 45°. The center point here corresponds to vertices of pages on the boundary between the pages. The divided point is a point indicating each divided area on a side intersecting with the boundary of pages. As described above, the page turning is represented by determining the angle between the line connecting the coordinate position of each divided point to the center point and the x-axis (such an angle is also referred to as an "angle between each divided area and the x-axis"). The angle between each divided area and the x-axis is a display angle of a sheet of paper in a preview image of the sheet of paper. Graph data illustrated in FIG. 11 and FIG. 12 indicates the relationship between an animation time (t) and the angle corresponding to each position on the page in the graphs in FIG. 11 and FIG. 12, the page turning angle is varied from 0° to 180° during a time period when the animation time (t) is varied from 0.0 to 1.0. In the first embodiment, varying the positions of end portions of the page with the variation in the animation time (t) varies the angles corresponding to the positions of the end portions of the page (the position of the sheet of paper). In other words, in the first embodiment, the position of the page is varied with the animation time, that is, the elapse of the display time to vary the angle of each divided area.

Figure 11:
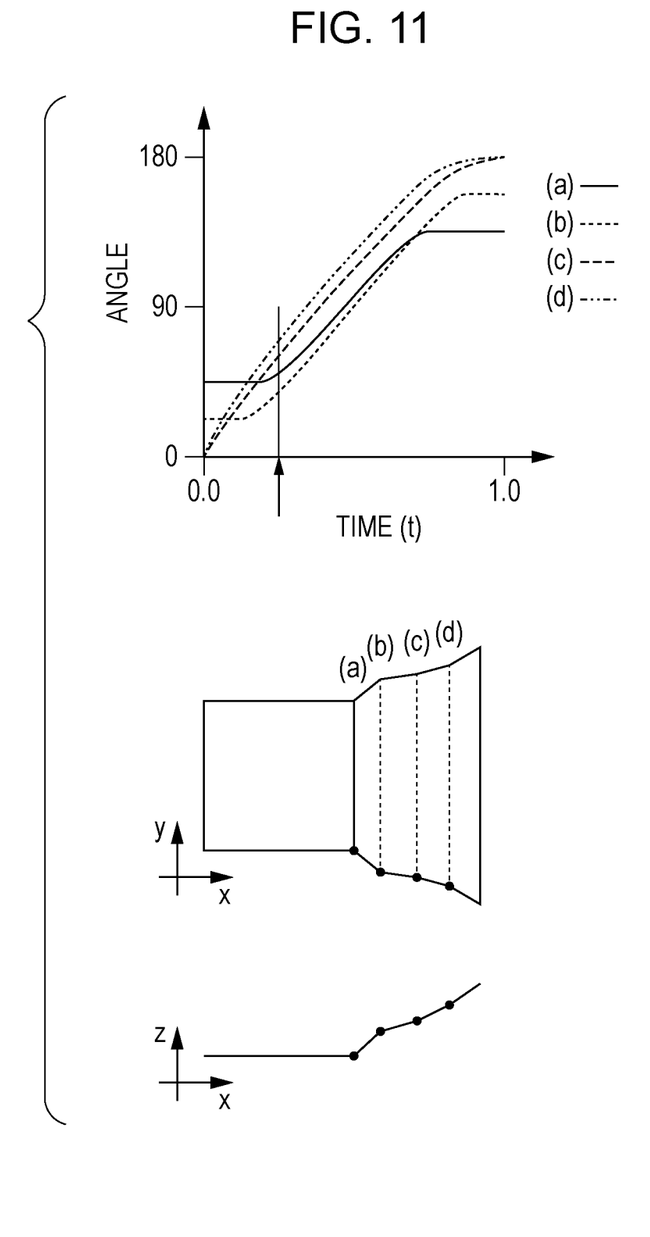
FIG. 11 illustrates exemplary angle data in perfect binding in the first embodiment.
Figure 12:
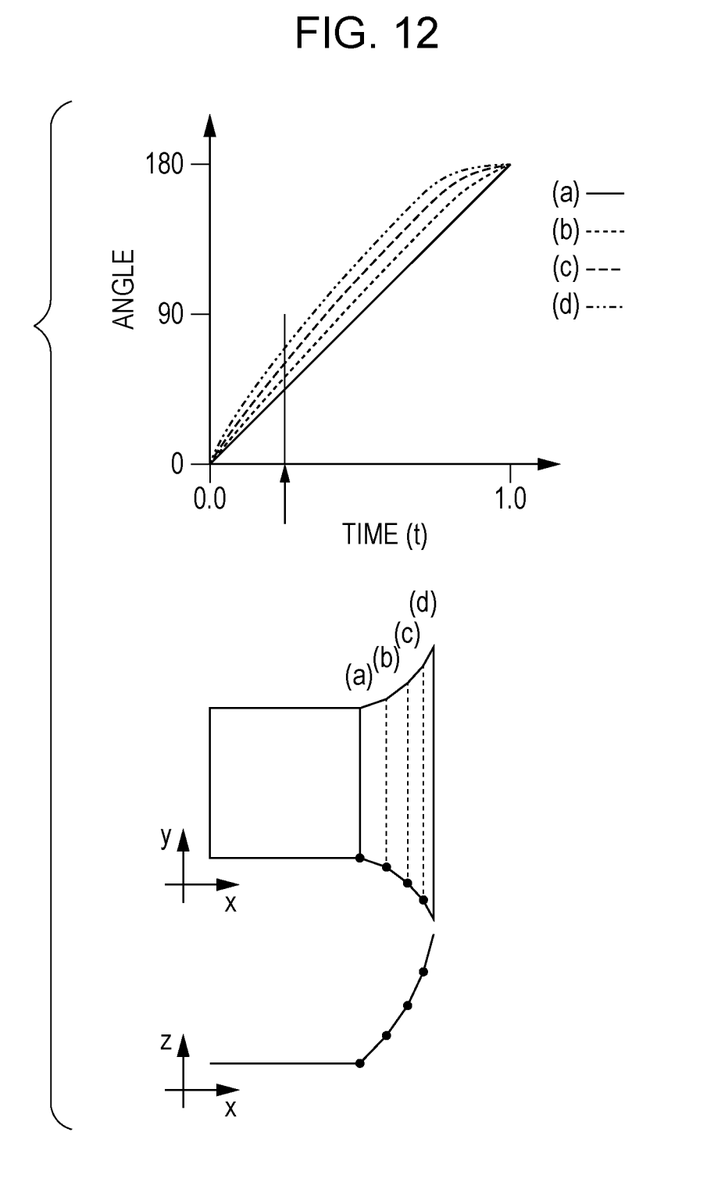
FIG. 12 illustrates exemplary angle data in lay flat binding in the first embodiment.

FIG. 11 illustrates the angle data (angle parameters) in the case of the perfect binding. FIG. 12 illustrates the angle data in the case of the lay flat binding. Referring to FIG. 11 and FIG. 12, (a) to (d) each indicate the angle between the area (plane) from each divided point to the next divided point and the x-axis. In other words, the angles in the graphs in FIG. 11 and FIG. 12 indicate the angles of the respective areas resulting from the division at the divided points. In addition, in FIG. 11 and FIG. 12, diagrams illustrating the images of albums and plot diagrams on the xz coordinate indicate the states at a time indicated by an arrow in the graph data.

The angle between each divided area in the page in FIG. 9 and the x-axis is determined from the angles in the graph data in FIG. 11 and FIG. 12 and the coordinate position of each divided point is calculated (identified) based on the angle between each divided area and the x-axis. Drawing the preview image of the page based on the identified coordinate position of each divided point allows the page turning animation to be drawn.

Although an example visually representing a case in which the user turns a page at a central point of the right side of the page with his/her fingers is described as the process of drawing the page turning animation in the following description, for example, a case in which the user turns a page at a lower point of the right side of the page with his/her fingers may be visually represented. When the case in which the user turns a page at a lower point of the right side of the page with his/her fingers is visually represented, the angle of an upper portion of the point where the user turns a page is differentiated from the angle of a lower portion thereof.

Referring back to FIG. 6, in Step S403, the application identifies the gloss parameters necessary for drawing from the paper type. Since the storage unit 108 holds the gloss parameters illustrated in FIGS. 7A and 7B in the first embodiment, either type of the gloss parameters is selected to identify the gloss parameters. Although the gloss parameters are set in advance because the gloss parameters of the paper type are not varied with time in the first embodiment, the gloss parameters may be included in a loop when it is necessary to determine the gloss parameters as needed due to, for example, the capacity of the memory.

In Step S404, the application sets the animation time (t) to 0.0.

In Step S405, the application identifies the angle of the sheet of paper necessary for drawing from the animation time (t) and the bookbinding mode. First, with reference to the graphs in FIG. 11 and FIG. 12, the angle between each divided area and the x-axis is acquired from the animation time (t). Then, 90 degrees are added to the acquired angle to acquire the normal of each divided area. If the normal exceeds 180 degrees, the normal is reversed because the display area is changed to the rear side.

In Step S406, the application draws the preview image of the spread page using the gloss parameters identified in Step S403 and the angle identified in Step S405. The preview image of the spread page is the preview image of the sheet of paper and the layout image. In drawing of the shape of the page, a drawing coordinate value is calculated from the angle between each divided area and the x-axis. Since the calculated coordinate value is a discrete value, a plane is drawn through linear interpolation, polygon drawing, or the like. In addition, in the drawing, the glossiness is calculated according to the calculation formula illustrated in FIG. 8 based on the normal of each position, the position of the light source that is set in advance, and the gloss parameters identified in Step S403. Since the coordinate value is a discrete value, the drawing color of each point is determined for drawing through the linear interpolation of the acquired drawing color and the linear interpolation of the normal. At this time, the bitmap image generated in Step S401 is applied on the preview image of the page, that is, an image is drawn on the preview image of the page based on the bitmap. This allows the preview image corresponding to the photo album data generated by the user to be displayed.

In Step S407, the application performs addition to the animation time (t).

In Step S408, the application determines whether the animation time (t) is longer than or equal to 1.0.

If the animation time (t) is shorter than 1.0 (NO in Step S408), the process goes back to Step S405. Since the addition to the animation time (t) varies the angle identified in Step S405, the preview image in Step S406 is varied. Then, the process goes to Step S407. The above processing is repeated until the animation time (t) reaches 1.0. If the animation time (t) is longer than or equal to 1.0 (YES in Step S408), the process illustrated in FIG. 6 is terminated.

Figure 13A:
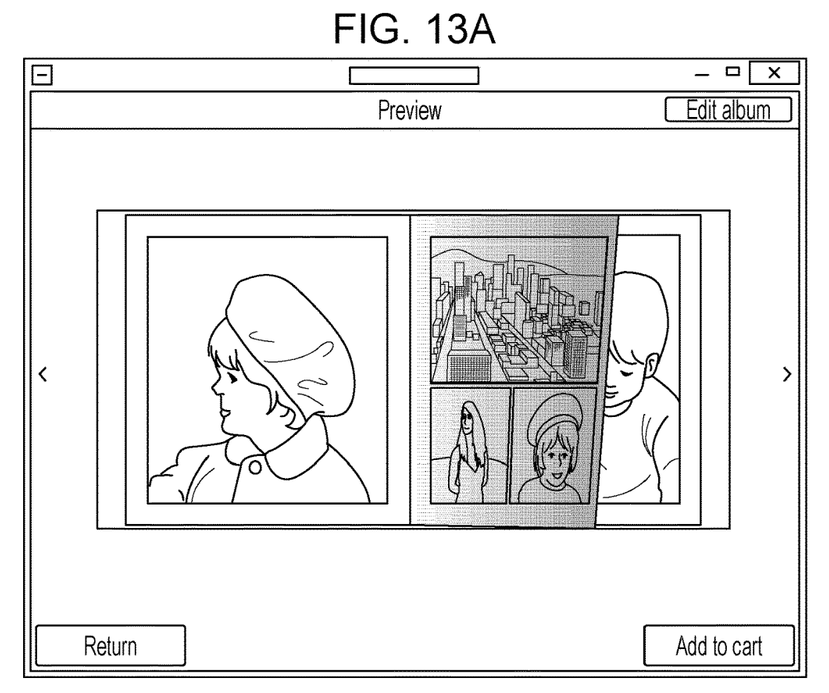
FIGS. 13A and 13B illustrate examples of preview of a photo album in the first embodiment.
Figure 13B:
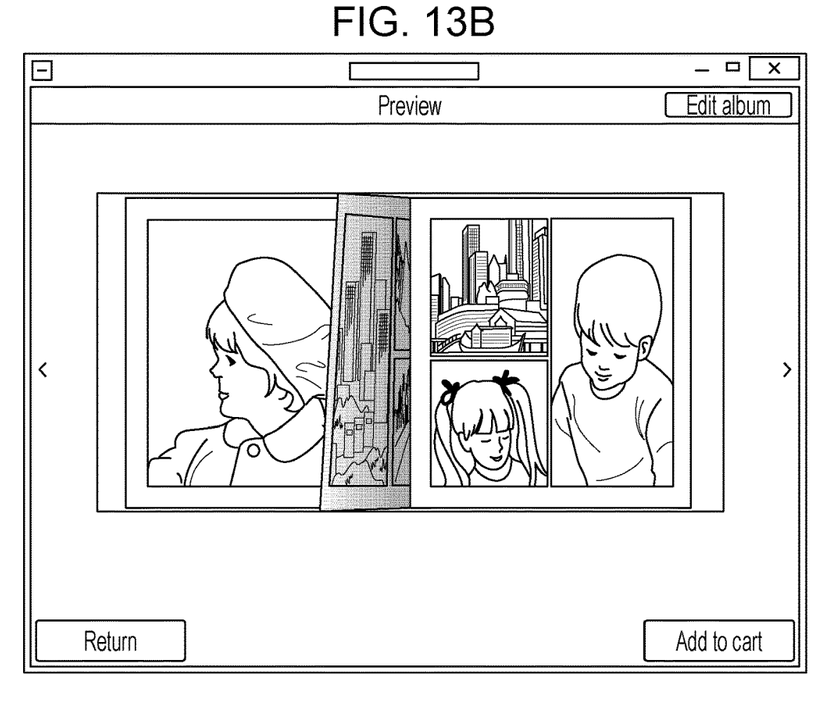
Figure 14A:
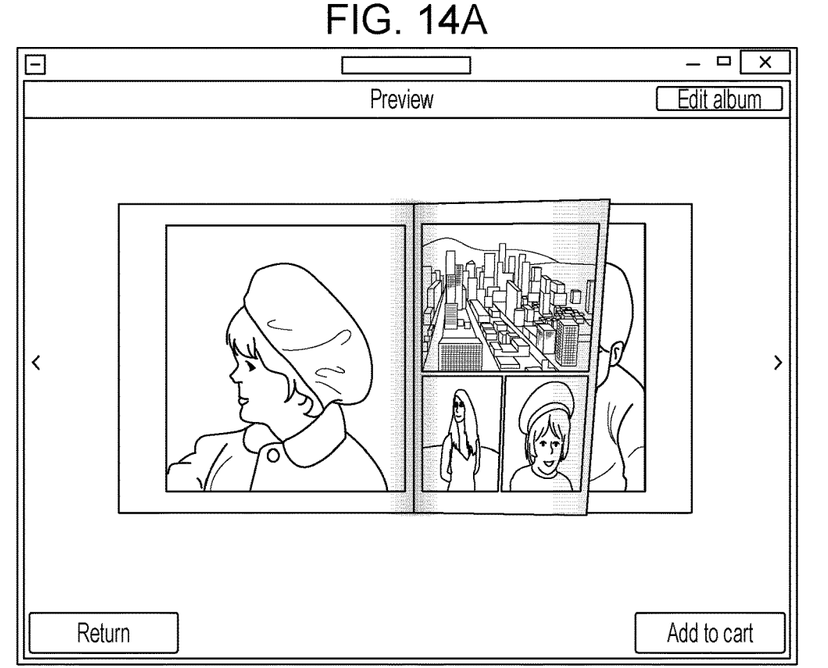
FIGS. 14A and 14B illustrate other examples of preview of the photo album in the first embodiment.
Figure 14B:
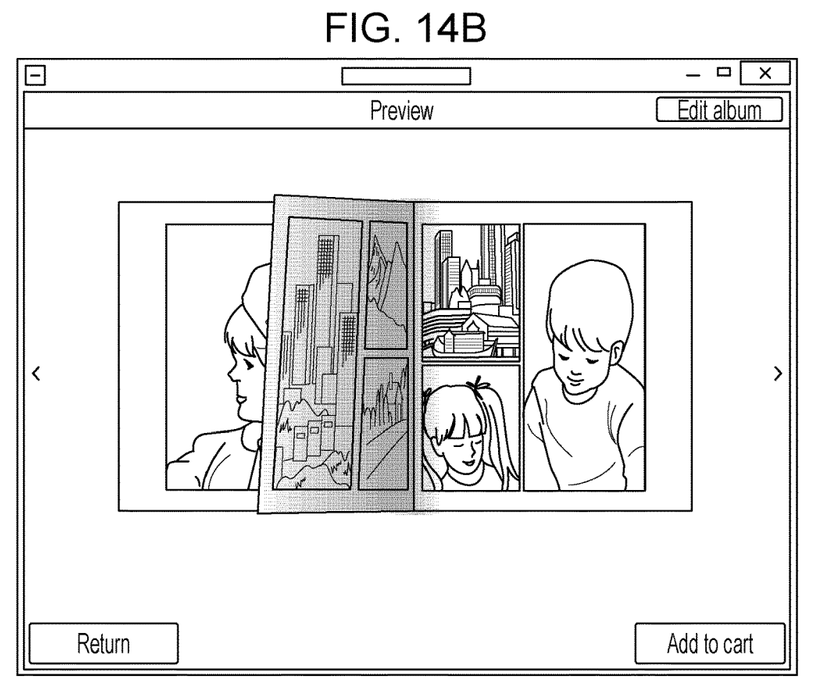

FIGS. 13A and 13B and FIGS. 14A and 14B illustrate examples of the process of drawing the page turning animation. FIGS. 13A and 13B illustrate examples of the process of drawing the page turning animation when the paper type is the matte paper and the bookbinding mode is the lay flat binding. FIGS. 14A and 14B illustrate examples of the process of drawing the page turning animation when the paper type is the glossy paper and the bookbinding mode is the perfect binding. As illustrated in FIGS. 13A and 13B and FIGS. 14A and 14B, the use of the gloss parameters corresponding to the paper type and the angle parameters corresponding to the bookbinding mode allows the texture of the finishing to be made more real.

The page turning animation of one page is capable of being displayed through the drawing process illustrated in FIG. 6. When the drawing process is performed to the subsequent pages, the process illustrated in the flowchart in FIG. 6 is repeated. At this time, the display is controlled so that the image corresponding to the page is displayed each time the page turning is performed. In other words, the bitmap data that is used is varied with the variation of the page to be drawn to vary the photo (image) to be displayed. When the user varies the paper type and/or the bookbinding mode after the page turning is terminated, the process illustrated in the flowchart in FIG. 6 is performed again.

In the page turning, the page turning animation may be displayed only when the user explicitly issues a page turning instruction or the page turning animation may be automatically continued to sequentially turn all the pages. When the page is turned in the opposite direction, the animation time (t) may be varied from 1.0 to 0.0 or angle data for the page turning in the opposite direction may be further provided to represent the page turning different form that in the forward direction.

When the user varies the paper type and/or the bookbinding mode after the page turning is terminated through the repetition of the process illustrated in the flowchart in FIG. 6, the page turning display is also varied in synchronization with the variation in the paper type and/or the bookbinding mode.

In the first embodiment, the page turning animation in preview may be varied and drawn in accordance with the bookbinding mode and the paper type specified by the user. Specifically, the page turning animation is capable of being drawn based on data in which the photo of the user is laid out and the paper type and bookbinding mode parameters selected by the user. In the case of a user who is unfamiliar with the bookbinding technology, it was difficult to estimate the final finishing from words indicating the paper type used for printing and the bookbinding mode, sample photos, and so on. Accordingly, when a photo album that is completed was delivered to the user and the user confirmed the finishing of the photo album, there were cases in that the finishing of the photo album was different from the texture which the user has estimated. There were cases in that, even if multiple paper types and bookbinding modes were provided, the user was not capable of accurately estimating the difference caused by change of the paper type or the bookbinding mode and the provision of the multiple paper types and bookbinding modes was meaningless to the customer. In contrast, since the paper type and the bookbinding mode are reflected in the drawing of the preview of the photo album in the first embodiment, it is easy to reflect the texture in the preview image. Accordingly, it is possible for the user to easily select a preferred bookbinding mode and a preferred paper type.

Since the paper type and the bookbinding mode are capable of being changed in real time during the page turning animation in the first embodiment, it is easy to indicate the difference in the finishing of the bookbinding, which is caused by the paper type and the bookbinding mode that are selected by the user.

According to the first embodiment, it is possible to represent the texture of the finishing.

<Other Embodiments>

The present invention is not limited to the above embodiment. For example, although the x-axis represents time in FIG. 11 and FIG. 12, the x-axis may represent the moving distance of the page. In this case, a moving distance 0 on the x-axis corresponds to a state in which the end of the page is at one end side of the spread page and a moving distance 1.0 on the x-axis corresponds to a state in which the end of the page is at the other end side of the spread page. In other words, the x-axis may represent the position of the end of the page (the position of the page turning). This supports a case in which the user has manually changed the position of the end of the page.

Although the creation of the photo album is exemplified in the above embodiment, the method in the above embodiment is not limited to this. The same method is also applicable to a case in which the preview image is displayed in printing of an image of a certain kind on a medium.

Although the angle data of the application is exemplified in the description of the page turning in the above embodiment, another parameter, such as curvature, may be used, instead of the angle data.

When a hard cover is used as the cover, the angle data concerning turning of the cover and the angle data concerning turning of the body may be separately provided depending on the bookbinding mode and the thickness of the sheet of paper used for the cover and the thickness of the sheets of paper used for the body may be represented using the respective pieces of angle data.

In addition, in order to represent the sound when each page is turned, a page turning sound that has been recorded in advance may be played back from an acoustic apparatus, such as a speaker, in the information processing apparatus 100 during animation to improve the presence.

Although the bitmap image is generated in Step S401 in FIG. 6 in the above embodiment, the generation of the bitmap image is not limited to Step S401. The bitmap image may be generated in Step S406 in FIG. 6.

Furthermore, in the above embodiment, bump mapping or displacement mapping may be applied depending on the paper type to represent a sense of irregularity.

Although both the gloss parameters corresponding to the paper type and the angle parameters corresponding to the bookbinding mode are applied in the above embodiment, only one of the parameters may be applied to display the preview image of the page.

Although the angle of the page turning only depends on the bookbinding mode in the above embodiment, the angle of the page turning may be determined based on both the paper type and the bookbinding mode because the flexure of the page is varied depending on the thickness of the paper type.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157649, filed Aug. 7, 2015, which is hereby incorporated by reference herein in its entirety.

What is claimed is:

1. A display control apparatus comprising:
at least one processor configured to cause the display control apparatus to act as:
a selecting unit configured to select a paper type to be used for print preview,
an acquiring unit configured to acquire an image data group, a generating unit configured to generate a layout image of a spread page by arranging at least an image based on image data in the image data group acquired by the acquiring unit, a display control unit configured to cause a display to display a preview image of the layout image of the spread page generated by the generating unit, and
a specifying unit configured to specify a glossiness of a page in the preview image,
wherein, in a case where the at least one processor causes the specifying unit to execute, the specifying unit executes to:
specify an angle parameter for each of a plurality of areas divided out of the page,
specify a glossiness for each of the plurality of areas based on a gloss parameter, wherein the gloss parameter is determined based on the paper type selected by the selecting unit, and the angle parameter specified for each of the plurality of areas, and specify a glossiness for each of the plurality of areas anew in a case where a position of the page changes based on page turning,
wherein, in a case where the display displays the preview image, the preview image is displayed based on the layout image of the spread page generated by the generating unit and the glossiness specified by the specifying unit.

2. The display control apparatus according to claim 1, wherein the selecting unit selects the paper type based on a user's instruction.

3. The display control apparatus according to claim 1, wherein the specifying unit further executes to specify the glossiness for each of the plurality of areas each time a position of a page for which the page turning is being performed changes by a predetermined distance.

4. The display control apparatus according to claim 1, wherein the at least one processor further is configured to cause the display control apparatus to act as a second selecting unit configured to select a bookbinding mode, and
wherein the specifying unit further executes to specify the angle parameter for each of the divided areas based on the bookbinding mode selected by the second selecting unit.

5. The display control apparatus according to claim 1, wherein the specifying unit further executes to specify a normal vector for each of the plurality of areas as the angle parameter.

6. The display control apparatus according to claim 1, wherein the specifying unit specifies the glossiness for each lapse of predetermined time from a start of the page turning.

7. The display control apparatus according to claim 6, wherein the specifying unit specifies an output luminance as the glossiness based on an input luminance, a plurality of luminance determining coefficients, a normal vector for each of the plurality of area, a vector that indicates a direction of a light source, a vector that indicates a direction of point of view of a user, and a vector that indicates a direction of specular reflection for each of the plurality of area.

8. The display control apparatus according to claim 1,
wherein the specifying unit generates album data that includes a layout image of a plurality of spread pages, and
wherein printing is performed based on the generated album data.

9. The display control apparatus according to claim 1, wherein, in a case where a paper type is selected, the selected paper type is for a print product.

10. A display control method for a display control apparatus, the display control method comprising:
 selecting a paper type to be used for print preview;
 acquiring an image data group;
 generating a layout image of a spread page by arranging at least an image based on image data in the acquired image data group;
 causing a display to display a preview image of the generated layout image of the spread page; and
 specifying a glossiness of a page in the preview image, wherein specifying further includes:
  specifying an angle parameter for each of a plurality of areas divided out of the page,
  specifying a glossiness for each of the plurality of areas based on a gloss parameter, wherein the gloss parameter is determined based on the selected paper type, and the angle parameter specified for each of the plurality of areas, and specifying a glossiness for each of the plurality of areas anew in a case where a position of the page changes based on page turning,
 wherein, in a case where the display displays the preview image, the preview image is displayed based on the generated layout image of the spread page and the specified glossiness.

11. The display control method according to claim 10, wherein selecting includes selecting the paper type based on a user's instruction.

12. The display control method according to claim 10, wherein specifying further includes specifying the glossiness for each of the plurality of areas each time a position of a page for which the page turning is being performed changes by a predetermined distance.

13. The display control method according to claim 10, wherein selecting is a first selection, the display control method further comprising selecting a bookbinding mode,
 wherein specifying further includes specifying the angle parameter for each of the divided areas based on the selected bookbinding mode.

14. The display control method according to claim 10, wherein specifying further includes specifying a normal vector for each of the plurality of areas as the angle parameter.

15. The display control method according to claim 10, wherein specifying further includes specifying the glossiness for each lapse of predetermined time from a start of the page turning.

16. The display control method according to claim 15, wherein specifying further includes specifying an output luminance as the glossiness based on an input luminance, a plurality of luminance determining coefficients, a normal vector for each of the plurality of area, a vector that indicates a direction of a light source, a vector that indicates a direction of point of view of a user, and a vector that indicates a direction of specular reflection for each of the plurality of area.

17. The display control method according to claim 10, wherein specifying further includes generating album data that includes a layout image of a plurality of spread pages, the display control method further comprising printing is performed based on the generated album data.

18. The display control method according to claim 10, wherein selecting the paper type includes selecting the paper type for a print product.

* * * * *